United States Patent [19]

Pinkoski

[11] Patent Number: 5,742,817
[45] Date of Patent: Apr. 21, 1998

[54] METHOD AND APPARATUS FOR FILE SERVER ADDRESSING

[75] Inventor: Aiko M. Pinkoski, Sudbury, Mass.

[73] Assignee: EMC Corporation, Hopkinton, Mass.

[21] Appl. No.: 569,745

[22] Filed: Dec. 8, 1995

[51] Int. Cl.$^6$ ........................................ G06F 17/00
[52] U.S. Cl. .................. 395/616; 395/601; 395/602; 395/611
[58] Field of Search ..................... 395/601, 616, 395/618, 610, 614, 602, 611

[56] References Cited

U.S. PATENT DOCUMENTS

| | | | |
|---|---|---|---|
| 4,887,204 | 12/1989 | Johnson et al. | 395/610 |
| 4,897,781 | 1/1990 | Chang et al. | 395/617 |
| 5,151,989 | 9/1992 | Johnson et al. | 395/610 |
| 5,175,852 | 12/1992 | Johnson et al. | 395/608 |
| 5,202,971 | 4/1993 | Henson et al. | 395/608 |
| 5,355,453 | 10/1994 | Row et al. | 395/200.49 |
| 5,367,671 | 11/1994 | Feigenbaum et al. | 395/601 |
| 5,371,885 | 12/1994 | Letwin | 395/621 |
| 5,388,257 | 2/1995 | Bauer | 395/601 |
| 5,412,808 | 5/1995 | Bauer | 395/601 |

OTHER PUBLICATIONS

Stern, Hal "Managing NFS and NIS" Apr. 1991, Table of Contents, Chapters 5, 6 & 14.

*Primary Examiner*—Thomas G. Black
*Assistant Examiner*—Donald Min
*Attorney, Agent, or Firm*—Pearson & Pearson

[57] ABSTRACT

An addressing scheme for file servers. The file handle in a call that accesses a file includes a file system identification, a file identification or inode number and a generation number. The addressing system converts the multi-bit file identification number into an alternative path name that identifies a location for the file without the need for converting the real path name. In one particular embodiment the inode number in binary form is translated into a multiple digit hexadecimal form that is parsed into directory names. The last directory name provides the location of the designated file.

15 Claims, 15 Drawing Sheets

METHOD AND APPARATUS FOR FILE SERVER ADDRESSING

BACKGROUND OF THE INVENTION

1. Field of the Invention

This invention relates to servers in a standard computer network and more specifically to addressing for identifying files within a filing system residing at a server.

2. Description of Related Art

The known Network File System (NFS) provides a mechanism for solving a number of access problems that arise in a standard computer network and represents a standard filing system to which this invention is applicable. A traditional NFS server comprises a data storage medium, such as a single disk drive or a group of interconnected disk drives, control circuitry and control programs. Program space for the control programs is divided into user space and kernel program space. Typically the interface between the programs in the user and kernel program spaces is well defined allowing changes in kernel programs to be transparent at the user level.

In use, access to a file at a server begins when a client looks up a file name. In this operation the server receives a standard client file name in NFS notation. In response, programs resident at the server in kernel program space search through a list that establishes correspondences between each path name and an inode value that identifies, directly or indirectly, the location of the file and an attribute table related to that file. If the server finds a match, the server returns a file handle. In one embodiment, to which this invention is particularly applicable, the file handle contains a file system identification, the inode number for the file and a generation number for the file. Thereafter user requests for the file transport the file handle rather than the client file name. The file handle is opaque; that is, the user is not aware of, and need not be aware of, the exact structure of this file handle.

Using programs from the kernel program space is, as known, not desirable and sometimes not possible. To implement this process using only programs from the user program space, server programs will generate the file handle in an iterative fashion. In a first iteration, the program searches through a directory containing the list of file name and inode number correspondences until it finds a match. Then the program produces an initial parent handle. The program searches the parent directory until it finds a match in that directory. This process repeats for each directory at a subsequently lower level until the program retrieves the last part, the file name and determines the inode number that becomes the inode number for the file handle. Consequently during each iteration there is a search of a list in sequence to find a match. Assuming an even distribution of the use of files, on average this requires a search of one-half of the directory entries. Such searches in large file systems can require significant time and, in some circumstances, have an adverse effect on the overall operation of the file server.

The foregoing addressing technique and variations thereof are described in the following:

Stern, H., Managing NFS and NIS. O'Reilly & Associates, Inc., 1992

4,887,204 (1989) Johnson et al.
4,897,781 (1990) Chang et al.
5,151,989 (1992) Johnson et al.
5,175,852 (1992) Johnson et al.
5,202,971 (1993) Henson et al.
5,367,671 (1994) Feigenbaum et al.
5,371,885 (1994) Letwin
5,355,453 (1994) Row et al.
5,388,257 (1995) Bauer
5,412,808 (1995) Bauer The Stern publication generally describes NFS including its design and operation, particularly at Chapters 5, 6 and 14.

The Johnson et al. patents describe, collectively, an alternative to NFS which at the user level is similar to NFS. U.S. Pat. No. 5,175,852 particularly describes a file access structure that uses a series of directory searches, like those described above, to identify an inode number that becomes part of the file handle. U.S. Pat. No. 5,151,989 disclose a similar file access scheme. U.S. Pat. Nos. 4,897,781 to Chang et al. and 5,202,971 to Henson et al. disclose variations of the systems in the Johnson et al. patents.

U.S. Pat. No. 5,367,671 to Feigenbaum discloses a data processing system that utilizes extended attribute data in association with object names. The object names represent paths in directory access storage devices and data files stored in such devices. Function calls from client or application programs use either a file name or extended attribute handle to access the extended attribute data.

U.S. Pat. No. 5,371,885 to Letwin discloses a system in which each file node allocates memory to one or more files. This memory also maintains the location of each file node. This system passes a path name into its individual components that individually constitute a directory, subdirectory or file name.

U.S. Pat. No. 5,355,453 to Row et al. also discloses a file server architecture including an NFS layer. It describes a method and apparatus for connecting file system identification and file inode number to a physical location by reading entries from a cache memory.

U.S. Pat. No. 5,388,257 to Bauer discloses a computer-based file system that accesses files with search requests evoked by file identifiers embedded in standard operating system calls. In this system each file has a unique number and generation number, much like NFS. Access to the file can be either by a path name or by a special form of the inode number and generation number.

In U.S. Pat. No. 5,412,808 to Bauer a file system includes files which may have one or more data streams associated with them. The files are accessed using a base name and an associated data stream is accessed using a prefix and/or a suffix of the base name. For example, the base name is used to select a data file while the prefix, suffix or both provide access to the data stream which, illustratively, includes information used by the file system in the processing of the data file. Using this file naming structure enables the file system to handle the base name file and its associated data streams together as one file using the standard file commands.

As an alternative for improving operation, other systems modify kernel programs at the server. However, the modification of kernel programs is not considered good practice because subsequent changes in the kernel programs, especially by third party vendors, can have an adverse impact on the interaction between the user programs and kernel programs. In addition to the foregoing, any server has the potential of crashing. Certain server crashes can be tolerated without interfering with client operations except for delays. However, some problems associated with a system crash can become very troublesome. This is particularly true if a crash occurs when the server is in the process of developing a file-name inode correspondence.

SUMMARY

Therefore it is an object of this invention to provide a new file addressing scheme for file systems used at file servers.

Another object of this invention is to provide a file system addressing scheme that operates entirely in user space.

Still another object of this invention is to provide an addressing scheme that facilitates recovery from a server crash.

This invention is applicable to a file system in which client path names and unique numerical values identify each file and in which certain server operations return to a client in the network a file handle including the unique numerical value. The file system includes a first set of links for establishing correspondences between the client path names and unique numerical values. In accordance with this invention, a server uses the file handle during subsequent operations by converting the unique numeral value into an alternate path name by means of a second set of links for establishing correspondences between the alternate path names and the locations of the files in the file system.

BRIEF DESCRIPTION OF THE DRAWINGS

It is the intent of the appended claims to point out and claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
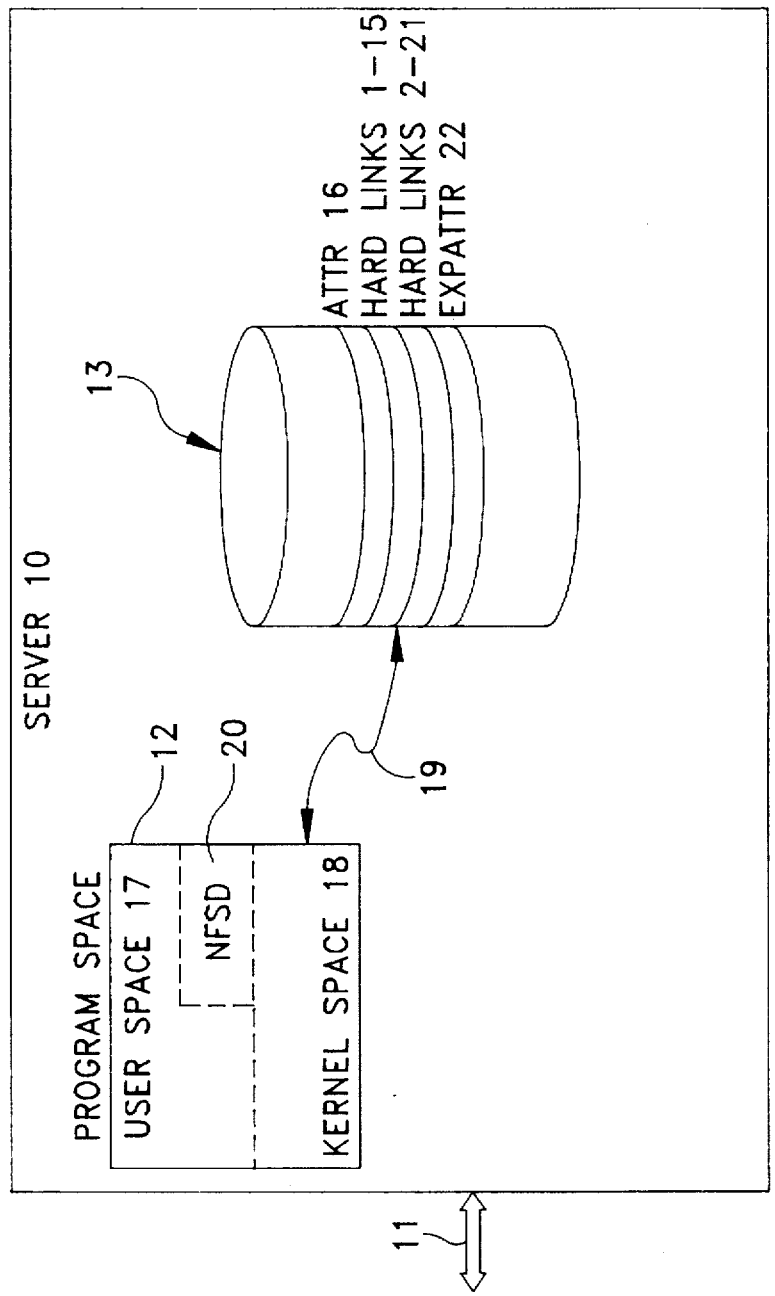
FIG. 1 schematically depicts a server that incorporates this invention.

FIG. 1 is a block representation of a server 10 adapted for connection to a communication link 11 in a network system, such one according to the NFS protocol. The server 10 includes a controller 12 and a primary storage media 13 represented as a single disk, although this media can comprise multiple disks.

The disk 13 includes a first set of links 15 that are "hard links" and that establish correspondences between client file names and the file inodes. A related ATTR table 16 stores attributes including a file generation number for each file. The controller 12 includes user programs in user space 17 and kernel programs in kernel space 18, all as well-known in the art.

A server 10 constructed in accordance with this invention adds to a conventional file server, new programs in the user level designated as user NFSD programs 20 and, on the storage media 13, a second set 21 of hard-links and a second attribute table 22. The second set of hard links 21 establishes correspondences between alternate path names produced in accordance with this invention and the location of files within the storage media 13. An EXPATTR attribute table 22 that indexes from the inode numbers obtained from the second list 21 contains file generation numbers.

Figure 2:
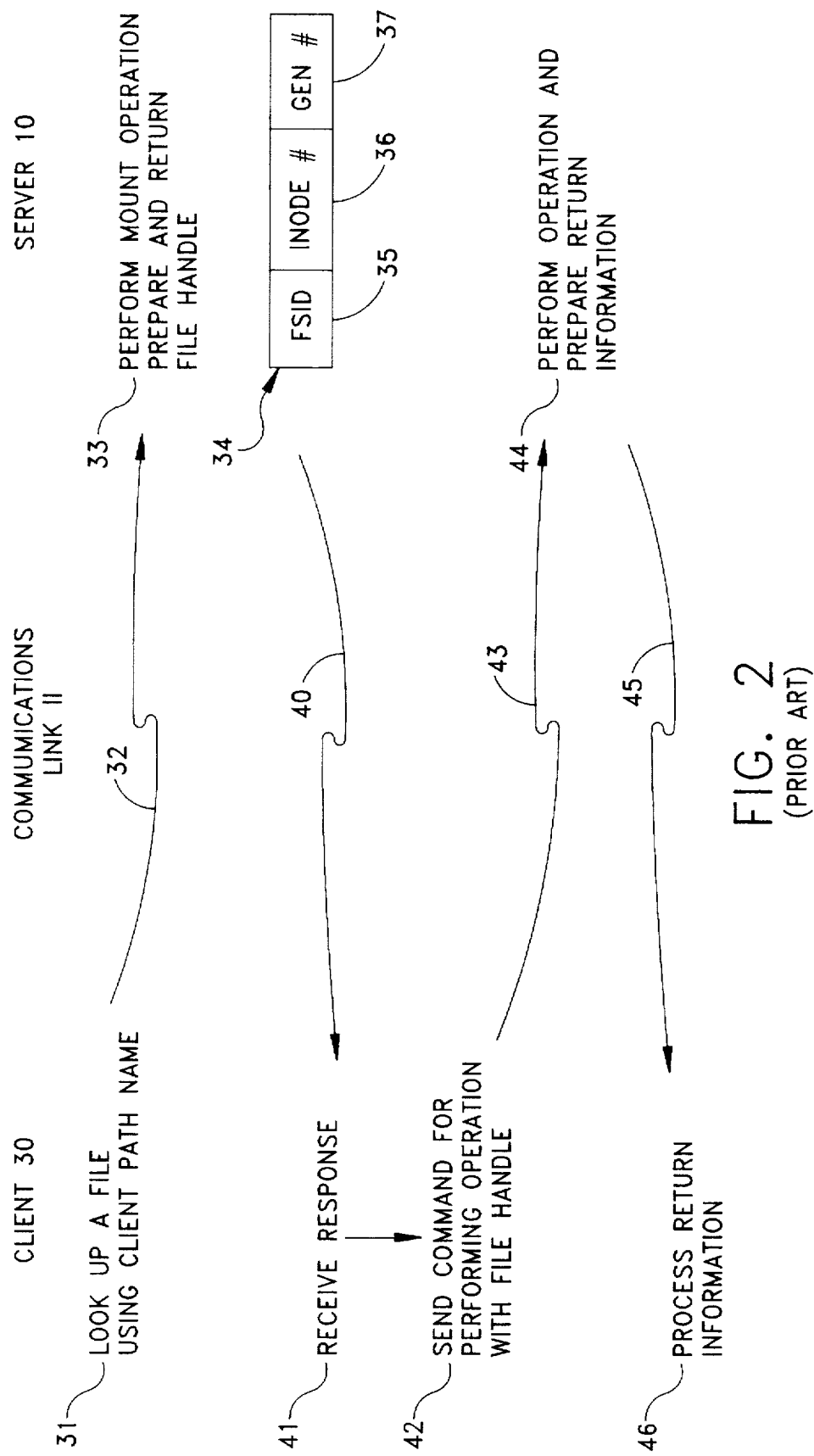
FIG. 2 depicts the interrelationship of the type of operation between a client and server in the prior art.

FIG. 2 depicts, in general form, the process by which a client 30 receives a file handle from the server 10 over the communications link 11 using prior art techniques. In a first step, the client initiates the process of accessing a file by requesting a lookup or some equivalent operation at step 31. The request for such an operation transfers over the communications link 11 at step 32. The client 30, as known in NFS systems, then waits for a response. The server 10 performs the requested operation in step 33 and generates a return file handle 34. In this particular embodiment, and typically, the file handle 34 includes an FSID field 35 that identifies the particular file system, an inode number 36 that uniquely identifies the file designated by the client path name within the file system and a generation number 37 that provides a time history for each inode number. The resulting file handle returns during step 40 to the client 30 that, in step 41, receives the response and stores the file handle for subsequent use. Step 42 represents a subsequent process by which the client 30 issues a call using the file handle for transfer to the server 10 in step 43. Step 44 represents the conversion of the file handle to a form that identifies a specific file and the process of completing the designated operation. Thereafter the server 10 sends information over the communications link 11 during a transfer 45. The client 30 receives and processes the return in step 46.

Figure 3:
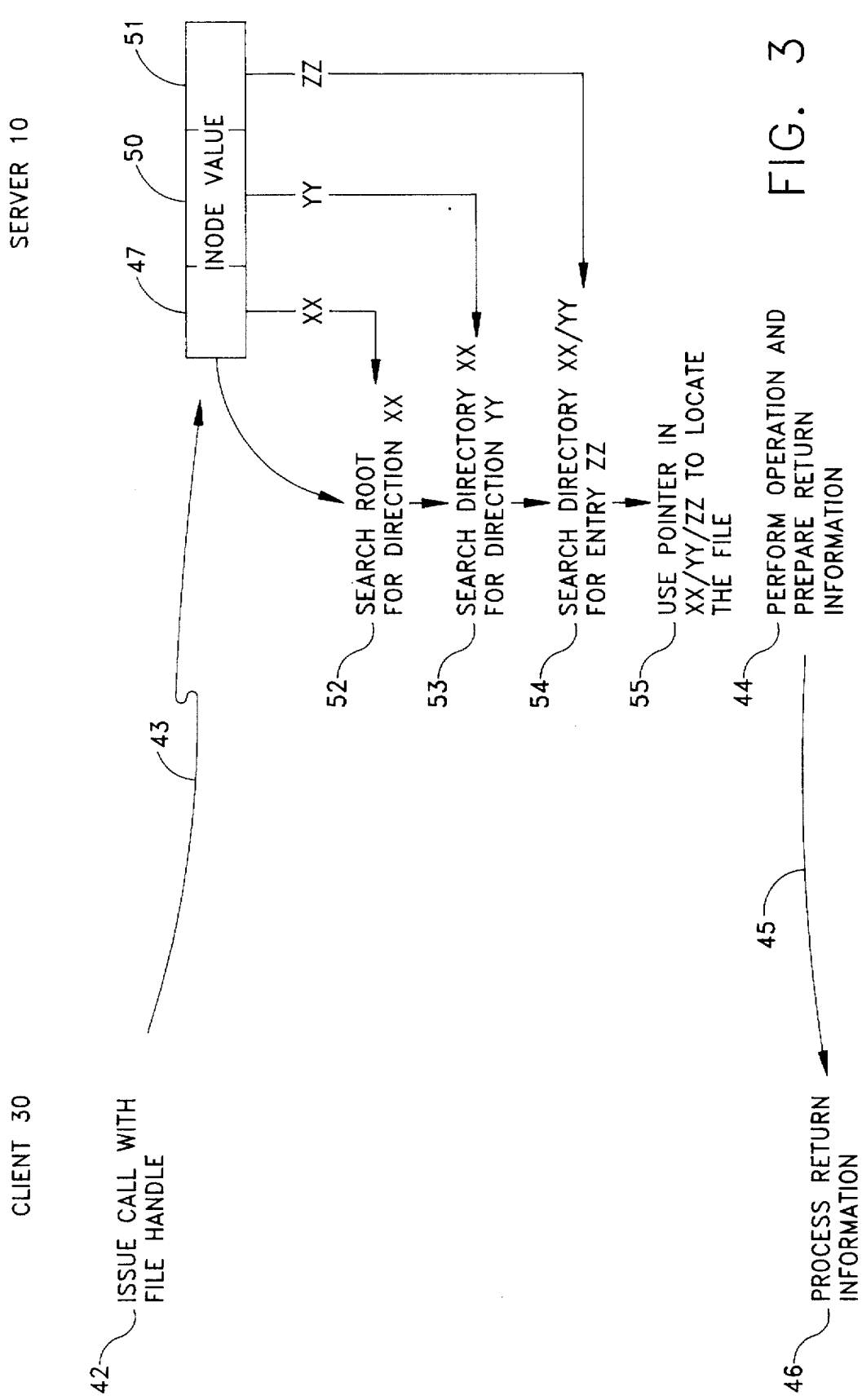
FIG. 3 depicts the interrelationship for a set of transfers between a client and server in accordance with this invention.

FIG. 3 depicts the operation with particular emphasis on the manner in which the server 10 interprets the file handle from the client 30 in accordance with this invention. As in FIG. 2 the operation begins when the client 30 in step 42 forms the data transfer request and transfers that request with the file handle at 43 to the server 10. The user level NFSD program 20 in FIG. 1 receives this file handle and converts the inode number into a multiple digit hexadecimal number. In one particular embodiment, the inode number has 24 bits. As shown in FIG. 3, this inode number is divided into three arbitrary sections identified by reference numerals 47, 50 and 51, each of which contains two hexadecimal digits. The designations "XX" "YY" and "ZZ" represent arbitrary hexadecimal digits for each of the sections. File handles could be divided into other combinations of digits in hexadecimal or other base number values. This particular embodiment, however, allows the designation of any one of over 16,000,000 files by a six-digit hexadecimal number.

Next the system looks to an initial directory which contains the second list 21 as shown in FIG. 1. It searches that directory for the entry "XX" hexadecimal digits in section 47. This occurs in step 52. When that directory is found, step 53 searches the "XX" directory for a "YY" subdirectory. In step 54 the system searches the directory "XX/YY" for the "ZZ" entry and in step 55, uses the "ZZ" entry as a pointer to the designated file. Then the server uses conventional steps, as in step 45, to perform the file operation and return a result to the client 30 for processing in step 46. Thus, it will be apparent that the transfers 43 and 45 are the same in both the prior art embodiment and an embodiment of this invention. Consequently, the inclusion and operation of this invention is transparent to the client.

Figure 4:
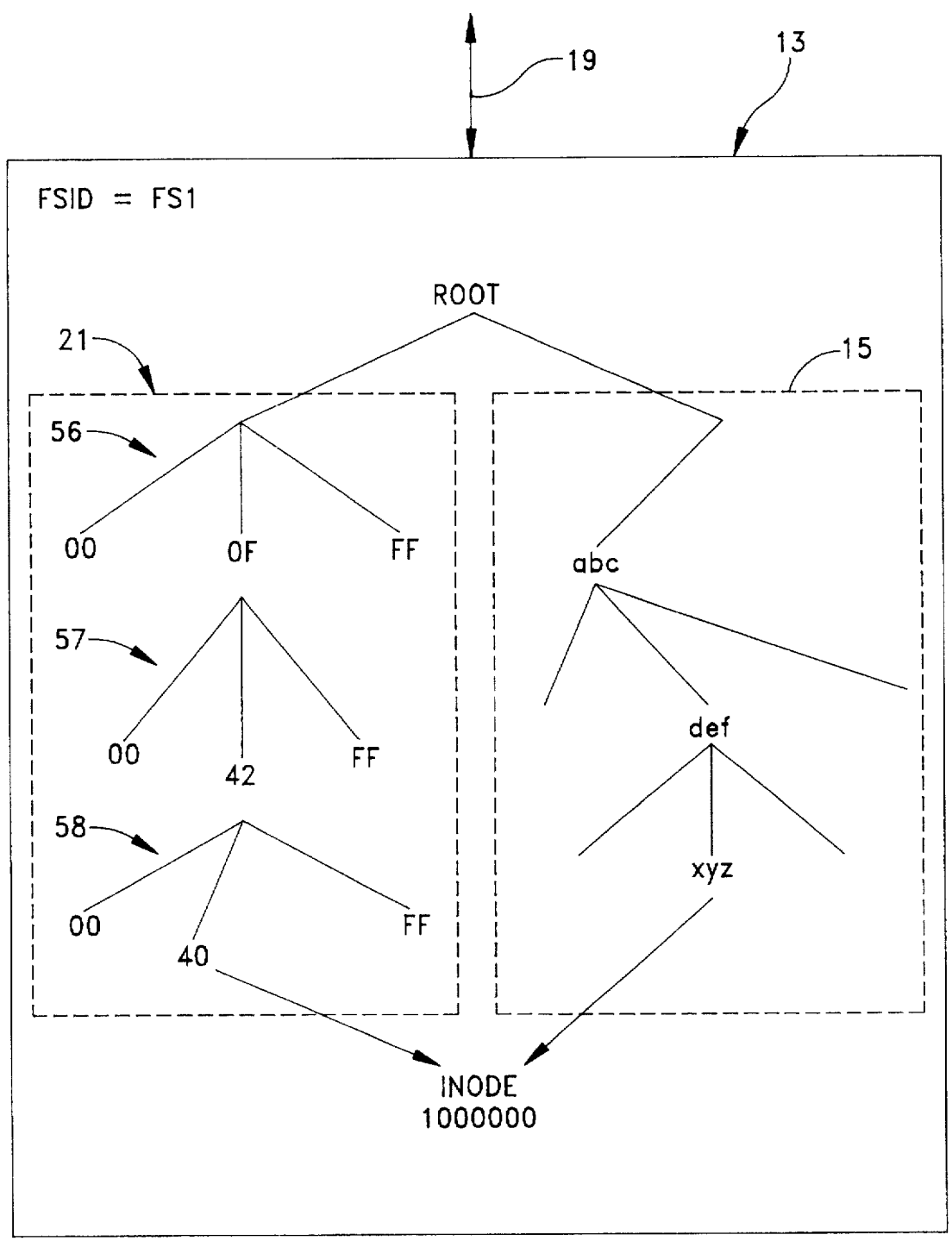
FIG. 4 depicts two sets of links that appear in a file server using this invention.

FIG. 4 depicts, in a representative tree form, the first set of links 15 and the second set of links 21 incorporated in the file system 13. Each of these sets may be within the root directory or subdirectory thereunder as known in the art. By way of example, assume (1) that the file system identification is "FS1" (i.e., FSID=FS1), (2) that the client path name from a root or base directory is ABC/DEF/XYZ and (3) that the file handle returned to the client includes an inode number $1,000,000_{10}$. In accordance with this invention, when the server 13 receives the file handle, it converts the inode number into an equivalent hexadecimal value represented by the hexadecimal string "0F4240" that is an alternate path name. At 56 in FIG. 4, the system moves to the second set of links 21 and identifies the first directory "0F" within the possible range of directories "00" through "FF". At 57 and within the directory "0F", the system searches for the directory "42" and at 58 and within the directory "0F/42" searches for the entry "40". The entry "40" is interpreted as a file name because it is the last location in the alternate path name. This file points to a location from which the system determines the physical location of the file with inode 1,000,000 and the physical location of the appropriate entries in the second attribute table 22 shown in FIG. 1. Even though, as previously indicated, a six-digit hexadecimal number has the capacity of identifying 16,000,000 files, the location of any such file can be found, again assuming an even distribution of the files for any access, on the average in under 400 searches as opposed to 8,000,000 for a full file system sequential search. Utilizing the second set of links 21 limits the number of lookups to three, with each lookup being limited to a maximum of 256 entries. The time required for these lookups is insignificant in comparison with the lookup times tolerated with a first reference to a particular file in a client process.

With this background, it will now be possible to understand the specific implementation of the user level program that implements the structure shown in FIG. 1. Specifically the following discussion defines an apparatus and method for one embodiment of this invention by indicating the manner in which a file handle is converted into an alternate path name, the process for creating the file handle and associated lists and the process by which the system recovers from a crash.

Figure 5:
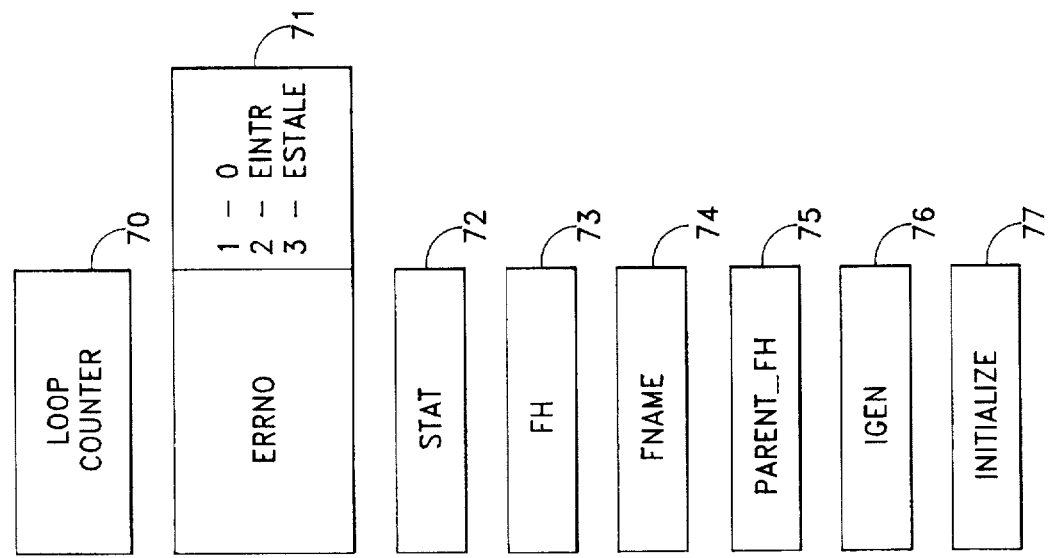
FIG. 5 depicts variables, arguments and procedures useful in understanding this invention.
Figure 5:
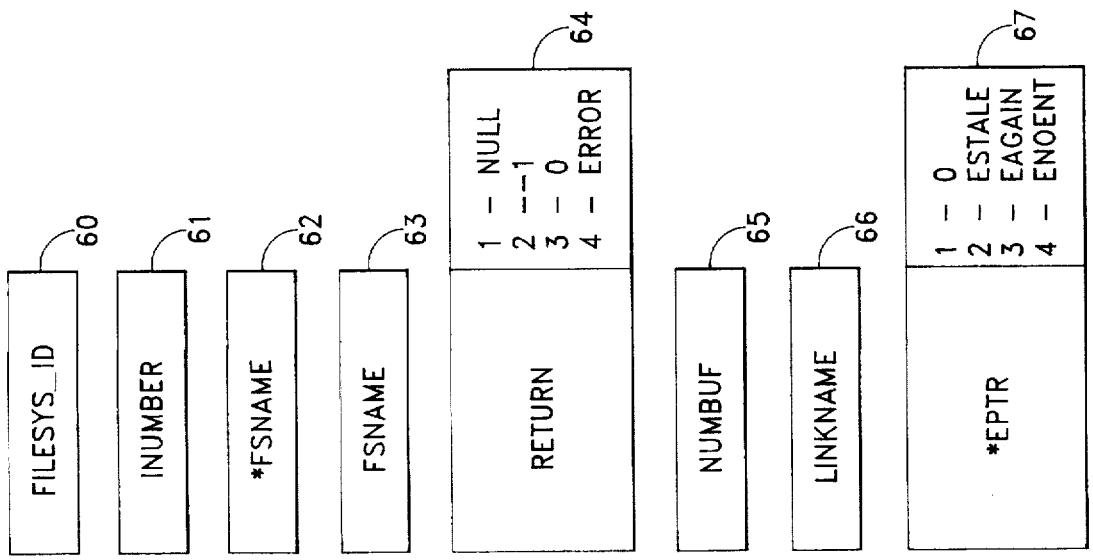

FIG. 5 depicts various arguments, variables and procedures 60 through 77 that are useful in understanding this process, such as the procedure in FIGS. 6A through 6E for obtaining the status of a file in a file system. This is an example of a procedure or method that converts the file handle into an alternate path name. It is the same basic procedure that the system utilizes to identify a file for a reading or writing operation.

Figure 6A:
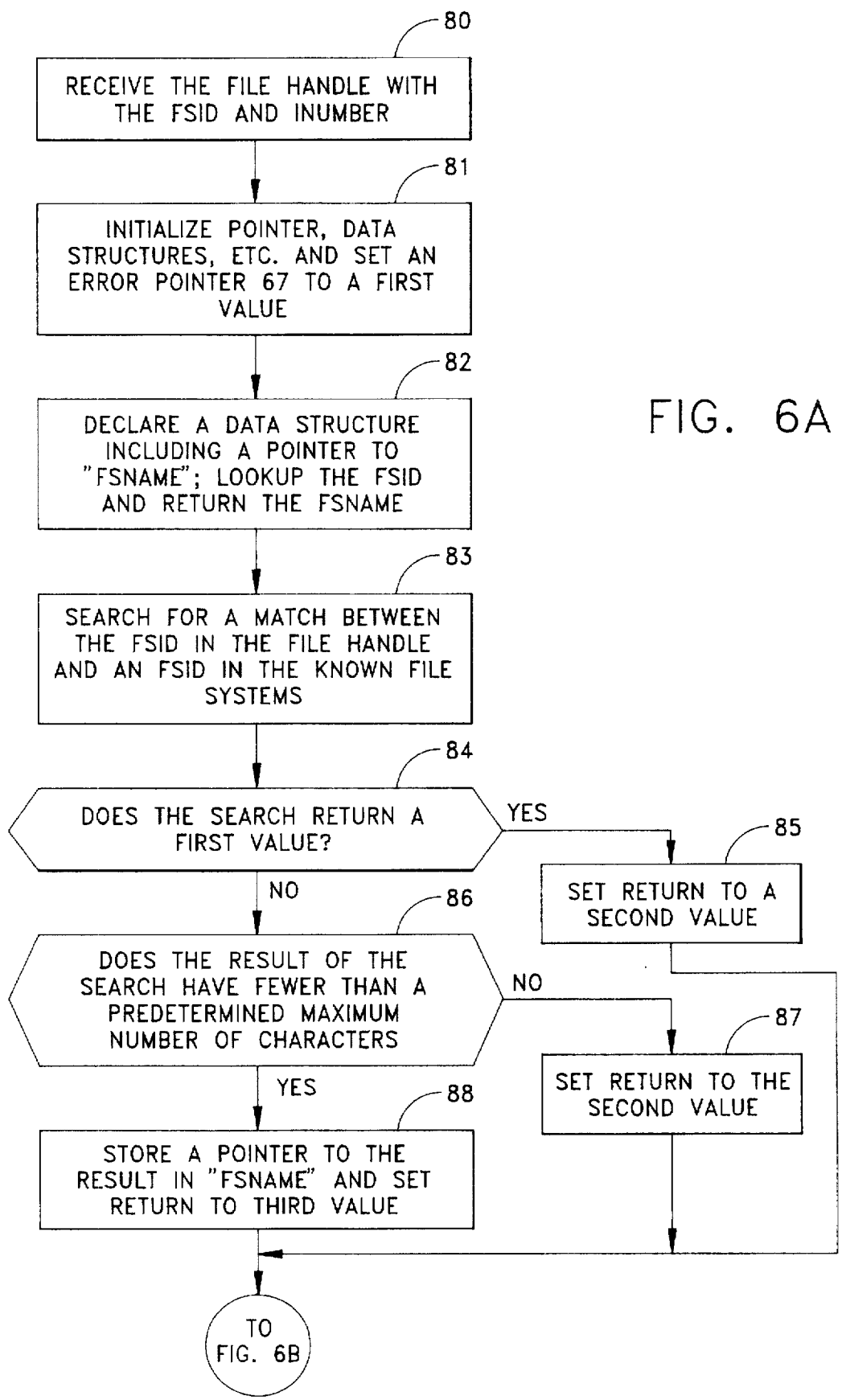
FIGS. 6A through 6E depict the process of using a file handle as an address in accordance with this invention.

In any of these procedures, step 80 in FIG. 6A represents the receipt of the file handle with a file system identification, in a FILESYS_ID register 60 and an inode number in an INUMBER register 61. In accordance with this invention and conventional programming techniques, the system uses step 81 in FIG. 6A to initialize the various pointers and data structures that would be necessary including some of those included in FIG. 5. In step 81, the system also initializes an error pointer 67 to a first, or reference value, which indicates a successful operation.

Step 82 represents the declaration of a data structure including an *FSNAME pointer 62 to an FSNAME variable 63. Step 83 implements a standard procedure whereby the system determines whether the information on the FILESYS_ID register 60 matches the file system ID and returns the file system name in the FSNAME register 63 as identified by the FSNAME pointer 62. As known, such an operation produces a RETURN variable 64 that can have any of several values; four values are shown in FIG. 5. In step 84 the system looks to see if the RETURN variable 64 has a first value, such as a "NULL". If it is a "NULL" indicating that no similar FSID exists, step 84 branches to step 85 converting the RETURN variable 64 to a second value (e.g., "−1") that is a standard value for indicating an error condition.

If the RETURN variable 64 has some other value, it is assumed that the RETURN information may include a file system name or identification. Step 86 determines whether the number of characters corresponds to that which would be involved in a valid FSID. If not, step 87 sets the RETURN variable 64 to the second value (i.e., "−1"). If the test in step 86 is satisfied, step 88 sets the *FSNAME pointer 62 to the result and transfers the result to the FSNAME register 63 and sets the RETURN variable 64 to a third value (e.g., "0") indicating a valid operation.

Figure 6B:
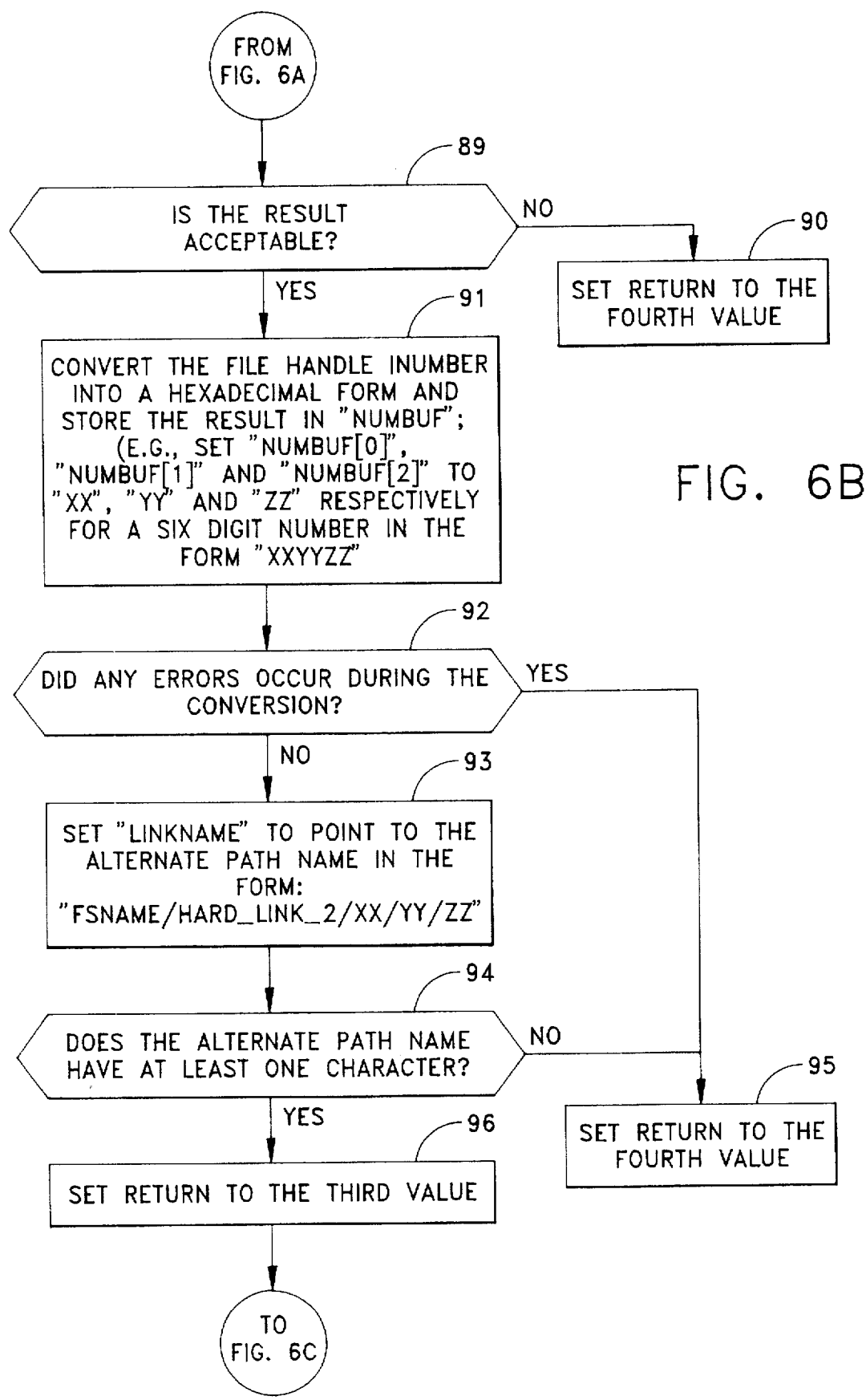

Step 89 in FIG. 6B then determines whether the result is acceptable by examining the RETURN variable 64 value. If it is not, in step 90 sets the RETURN variable 64 to a fourth value, such as "ERROR". However, if the result of these operations indicates an appropriate and validated file system identification in the FILESYS_ID register 60, control then transfers to step 91 in FIG. 6B whereupon the inode number in the INUMBER register 61 is converted into a hexadecimal value in the number buffer 65. In this particular embodiment a 24-bit inode number converts to a six-digit hexadecimal number in the form XXYYZZ. Step 92 tests the results to see if any errors occurred during conversion. If no errors occur, the LINK NAME register 66 receives the alternate path name in step 93 in the form:

FSNAME/LINK2/XX/YY/ZZ where "LINK2" is the directory containing the second set of hard links 21 in FIG. 1.

Still referring to FIG. 6B, step 94 determines whether the conversion has placed an appropriate value in the LINK NAME register 66. If the contents of the LINK NAME register 66 are valid, the system uses step 96 to set the RETURN variable 64 to the third value (e.g., "0") indicating a valid operation. If it has not or if an error is detected in step 92, the system transfers to step 95 whereupon the RETURN variable 64 receives the fourth value, the "ERROR" value, before control transfers to step 96 in FIG. 6C.

Figure 6C:
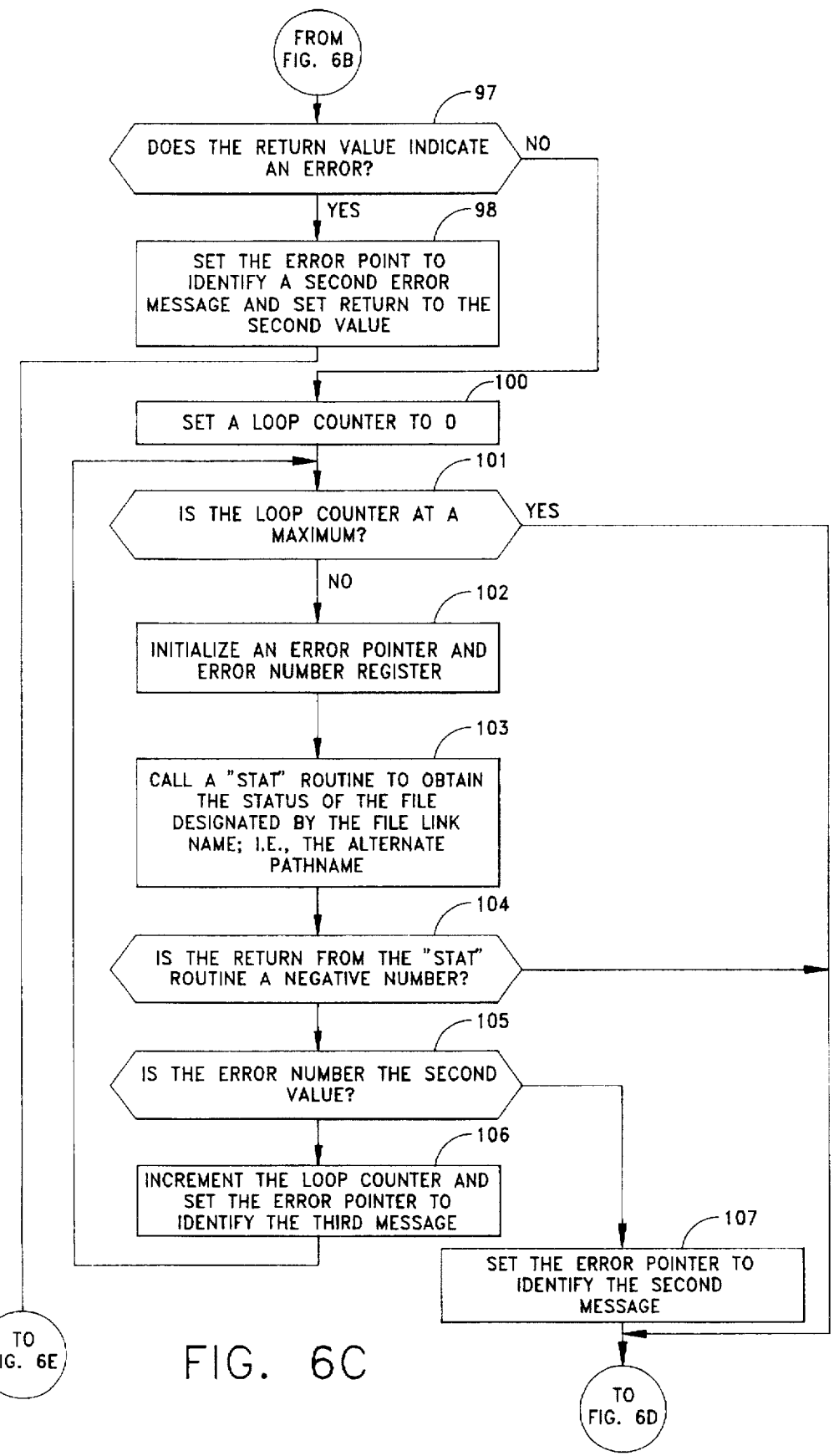

Notwithstanding of the foregoing steps, step 97 in FIG. 6C then determines whether the RETURN variable 64 indicates an error condition. If it does, step 98 sets an *EPTR pointer 67 to identify a second error message (e.g., "ESTALE") indicating an invalid generation number and sets the RETURN variable 64 to the second value (i.e., "−1"). Then control passes to FIG. 6E. If no error is detected in step 97, step 100 begins a loop for performing the designated operation. In this example, the purpose is to obtain the status of the file. The process begins by setting the LOOP COUNTER register 70 to an initial value (e.g. "0") in step 100. If the LOOP COUNTER variable 70 is not at a maximum in step 101, step 102 initializes the *EPTR pointer 67 and an ERRNO register 71 (e.g., *EPTR=0) and ERRNO=0). Next the system utilizes a standard STAT library procedure 72 in step 103 to obtain the status of the file designated by the alternate path name. If the RETURN variable 64 produced by the STAT routine 72 is a negative number indicating an error condition, the system diverts through step 104 to step 105 whereupon it is determined whether the ERRNO variable 71 has the second value, such as "EINTR" that indicates that the STAT routine should be retried until the loop counter reaches the maximum value allowed. If it does, step 105 diverts to step 106 that increments the LOOP COUNTER variable 70 and returns the system to step 101. If the ERRNO variable has any other second value step 105 diverts to step 107 whereupon the *EPTR pointer 67 identifies the "ESTALE" or second message that indicates a file generation number did not match.

Figure 6D:
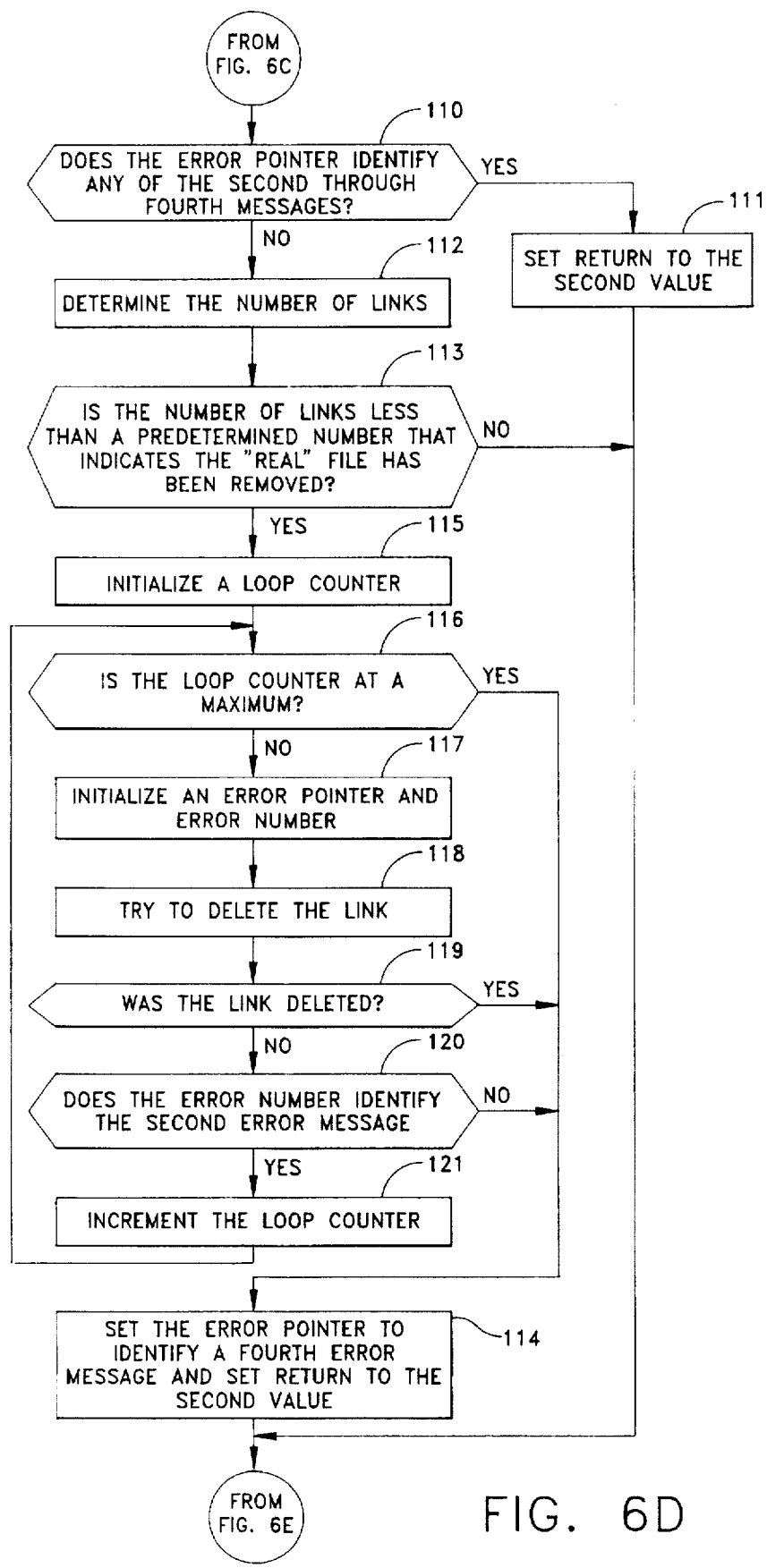

When the loop comprising steps 101 through 107 terminates either because the STAT procedure 72 returns a valid number, the system sees an error condition or the LOOP COUNTER register 70 reaches a maximum, the system uses step 110 in FIG. 6D to determine whether the *EPTR pointer 67 identifies any of the second through fourth messages. If it does, an error condition is indicated and step 110 diverts to step 111 thereby to set the RETURN variable 64 to the second value (e.g., "–1") before control transfers to FIG. 6E. If not, step 110 diverts to step 112 to determine the number of links.

Still referring to FIG. 6D, the system uses step 113 to determine whether a "real" file has been removed so that the corresponding link must also be removed. If it has not, an error condition exists, and step 113 diverts to FIG. 6E. If a "real" file has been removed, step 113 diverts to step 115 that initializes a loop to begin a series of attempts to delete the link.

In this particular embodiment the LOOP COUNTER register 70 controls the loop. It will be apparent that specific and distinct loop counters can control each different loop described herein. In step 116 the system determines whether the LOOP COUNTER variable 70 is at a maximum. If it is, operations divert to step 114. Otherwise the system uses step 117 to initialize the *EPTR pointer 67 and ERRNO variable 71 and then tries to delete the link related to the "real" file in step 118. If the link is deleted, step 119 diverts to step 114. Otherwise the system determines, in step 120, whether the ERRNO variable 71 identifies the second error message (e.g., the "EINTR" message) which indicates the deletion should be retried. If it does not, step 120 diverts to step 114. Otherwise in step 121 the system increments the LOOP COUNTER variable 70 and returns operations to step 116. Thus, at step 114 the system has determined that (1) no removed files exist and the link is valid at step 113, or (2) a real file has been removed and has the system either been successful in deleting the link in step 119, has encountered an error at step 120 or has run through the loop a maximum number of times at 116.

If the link was deleted, step 114 appropriately sets the *EPTR pointer 67 to identify a fourth error message (e.g., "NOENT") and the RETURN variable 64 to identify the second value (i.e., "–1") to indicate the file no longer exists. Then control passes to FIG. 6E.

Figure 6E:
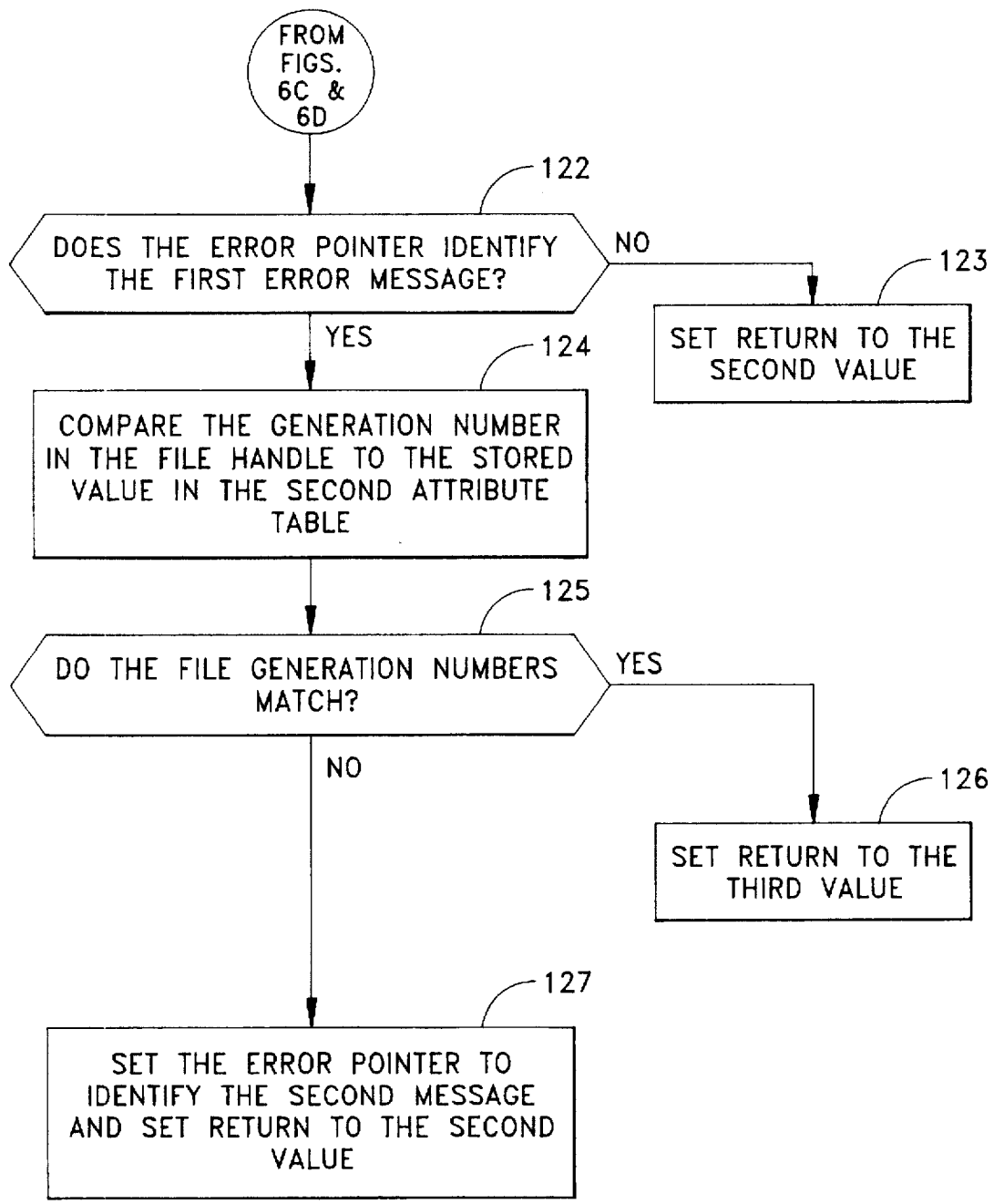

FIG. 6E depicts the final steps in the procedure. As previously indicated any of the conditions that cause the system to process step 98 in FIG. 6C, steps 111 or 114 in FIG. 6D or that results if it is determined that the number of links is equal to the predetermined number indicating a "real" file exists, transfers control to FIG. 6E. If, however, the *EPTR pointer 67 identifies the first error message (i.e., the "0" value message) indicating no error, step 122 diverts to step 123 to set the RETURN variable 64 to the third value (e.g., "0"). Operations then terminate.

Otherwise the system uses step 124 to compare the generation number in the file handle, such as the generation number 37 in FIG. 2, to the generation number in the corresponding entry in the second attribute table 22 shown in FIG. 1. If a match exists, step 125 diverts to step 126 to set the return to the third value indicating a successful procedure; that is, the presented file handle has been validated. If a match does not exist, step 125 diverts to step 127 to set the error pointer to the second value, e.g., ESTALE, to indicate the mismatch and to set the return to the second value, e.g., –1, to indicate an error. As will now be apparent, if upon completion of the operations in FIGS. 6A through 6E the RETURN variable 64 is set to the third value (i.e., "0"), the system has successfully converted the file handle and returned the file status successfully.

Figure 7A:
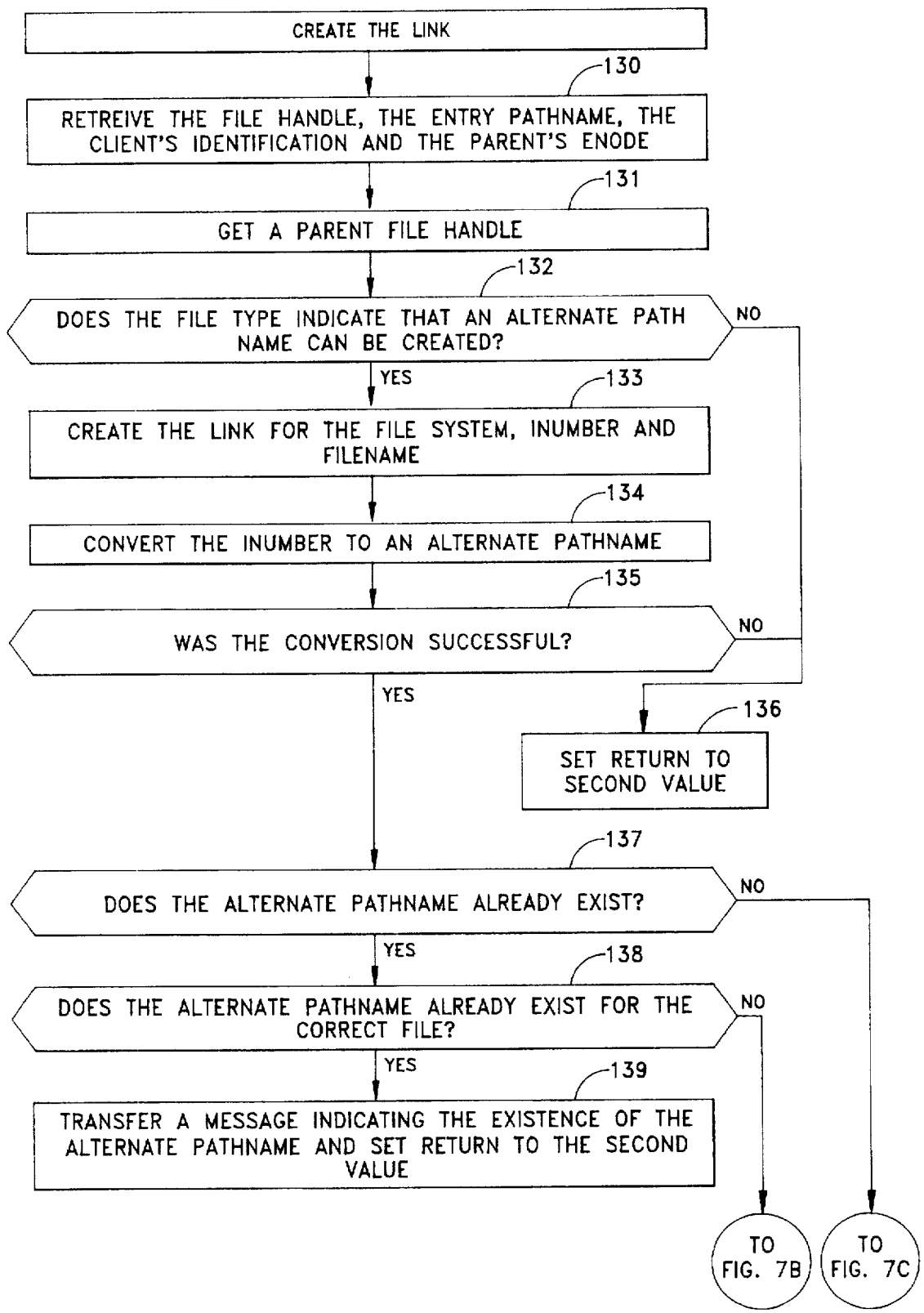
FIGS. 7A through 7C depict the process of creating a file handle in accordance with this invention.
Figure 7B:
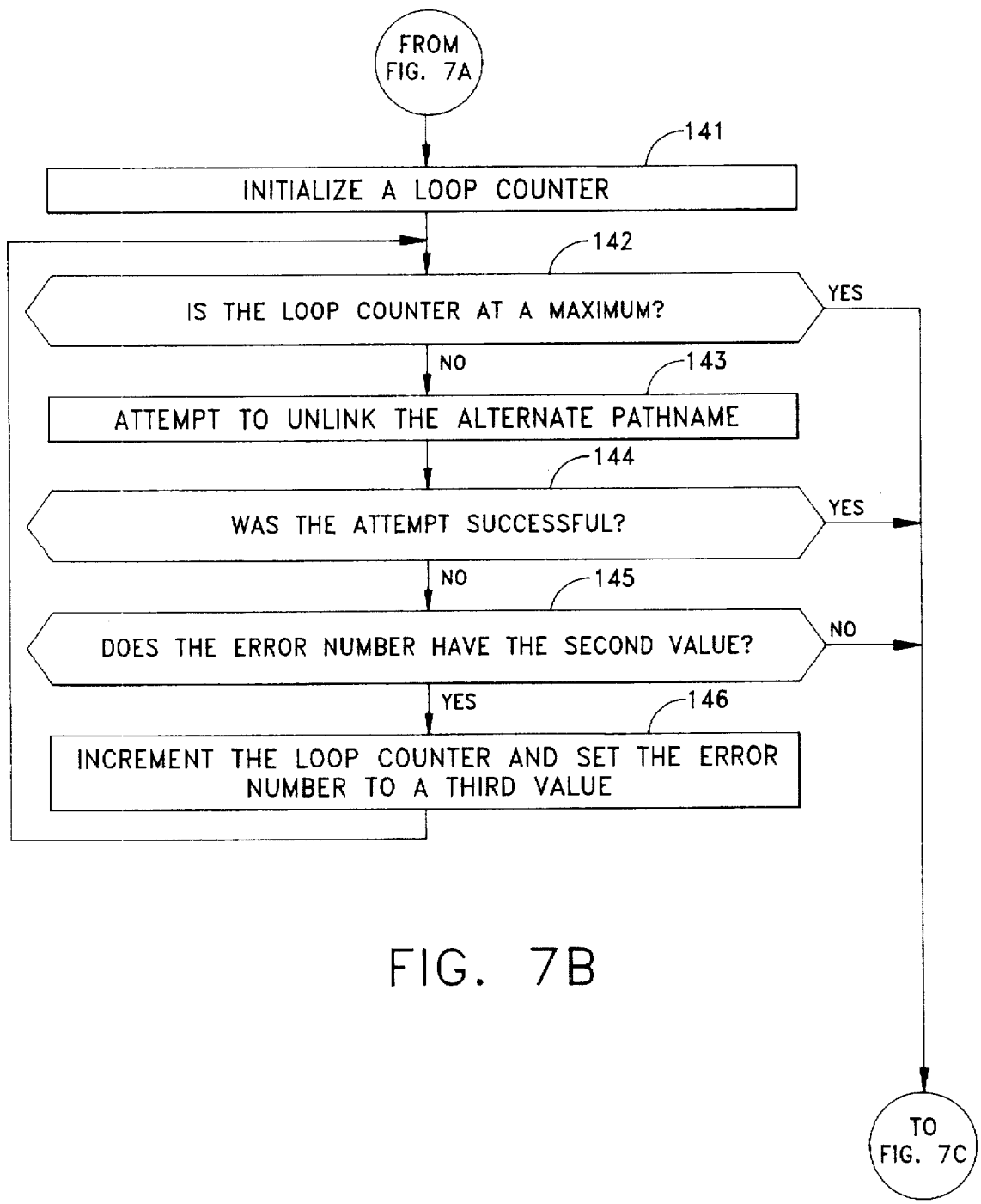
Figure 7C:
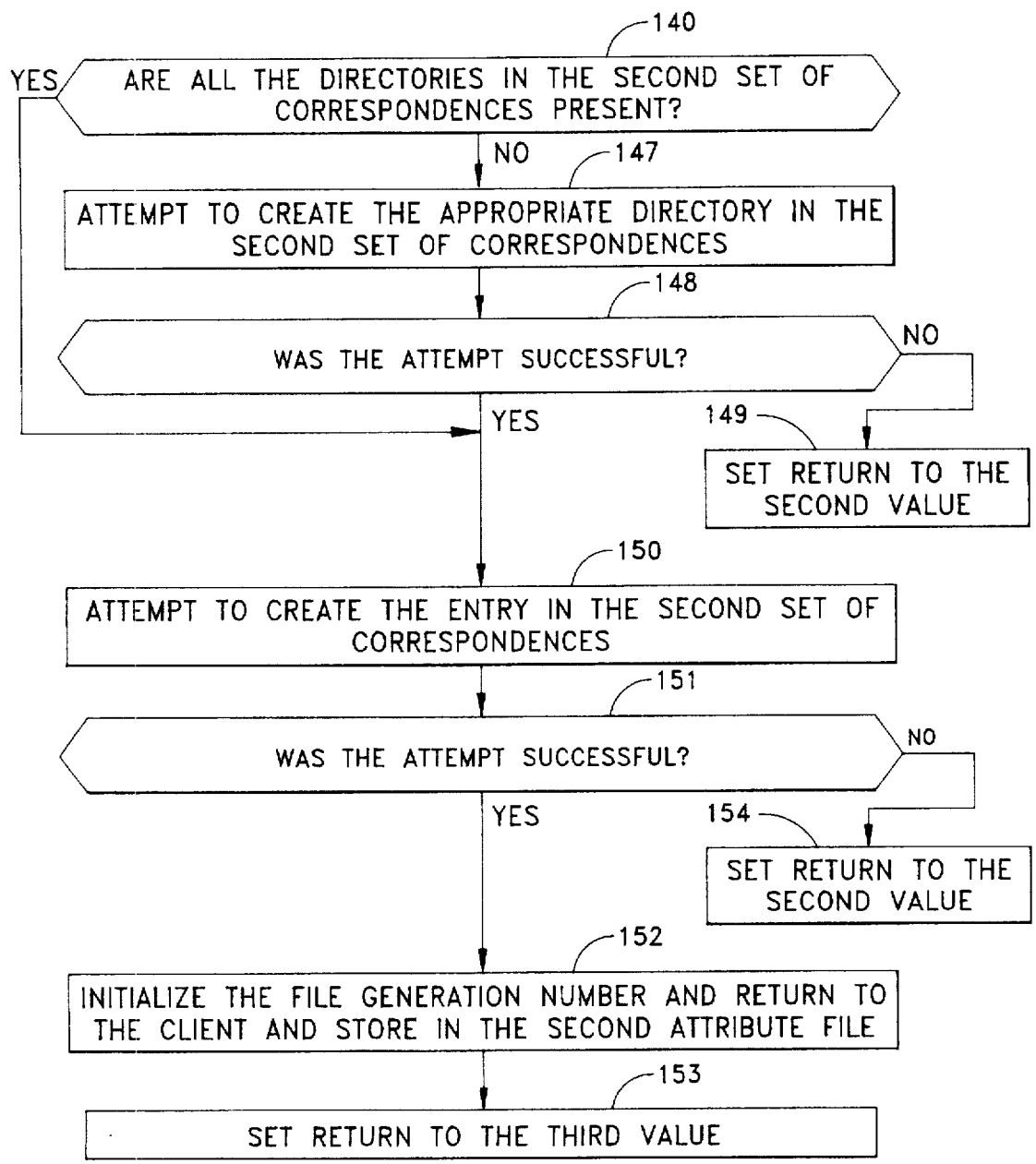

FIGS. 7A through 7C in conjunction with FIG. 5 depict the procedure and variables used in creating an entry in a second set of hard links 21 in FIG. 1. The process begins at step 130 in FIG. 7A wherein the system retrieves the file handle into the FH register 73, the entry path name as the FNAME variable 74 and the inode number as the INUMBER variable 61 shown in FIG. 5. In step 131 of FIG. 7A, the system retrieves the parent file handle as a PARENT_FH variable 75 and determines, in step 132, whether an alternative path name can be created. If it can, the system uses step 133 to create a link for the file system, inode number and file name. In step 134 the system tries to convert the inode number to the alternative path name using the same process as described in FIGS. 6A through 6C. After completing step 94 in FIG. 6C, the system returns to step 135 in FIG. 7A to determine whether the conversion was successful. If conversion was not successful or if step 132 indicates that the alternative path name can not be created, in step 136 the system sets the RETURN variable 64 to the second value (i.e., "–1") and the procedure terminates.

If the conversion is successful, step 137 determines whether the alternate path name already exists. If it does not, step 137 diverts to step 140 in FIG. 7C. Otherwise step 137 diverts to step 138 that determines whether an alternate path name already exists for the correct file. If it does, the system, in step 139, transfers a message indicating the existence of the alternate path name, sets the RETURN variable 64 to the second value, and the procedure terminates.

Alternatively, if the path name does not exist for the correct file, step 138 transfers to step 141 in FIG. 7B that initializes the LOOP COUNTER register 70 or an equivalent register. Step 142 determines whether the LOOP COUNTER register 70 is at a maximum. If it is not, the system attempts to unlink the path name in step 143. If step 144 determines that attempt to unlink the alternate path name was successful, the system uses step 145 to determine whether the ERRNO variable 71 has the second value and sets the ERRNO variable 71 to the third value (i.e., "EAGAIN"). If it does, the loop attempts to unlink the alternative path name again. If the attempt is successful, step 145 diverts to step 140 in FIG. 7C.

Referring to FIG. 7C, step 140 determines whether all the directories in the second set of correspondences (i.e., the second set of hard links 21) are present. If not, the system attempts to create an appropriate directory in step 147 and then determines in step 148 whether that attempt was successful. If the directory is present or the appropriate directory is created, the system uses step 150 to create the entries in the second set of links, i.e., the HARD LINKS 2 set 21, and in the second, or EXPATTR, attribute table 22 in FIG. 1. Still referring to FIG. 7C if that step is successfully completed, step 151 diverts to step 152 to initialize the file generation number. The system returns this generation number to the client and stores it in the corresponding entry of the second attribute table 22 in FIG. 1. Step 153 sets the RETURN variable 64 to the third value that indicates the valid completion of operation. Otherwise step 151 diverts to step 154 to set the RETURN variable 64 to the second value (i.e., "–1") indicating an error condition.

Figure 8A:
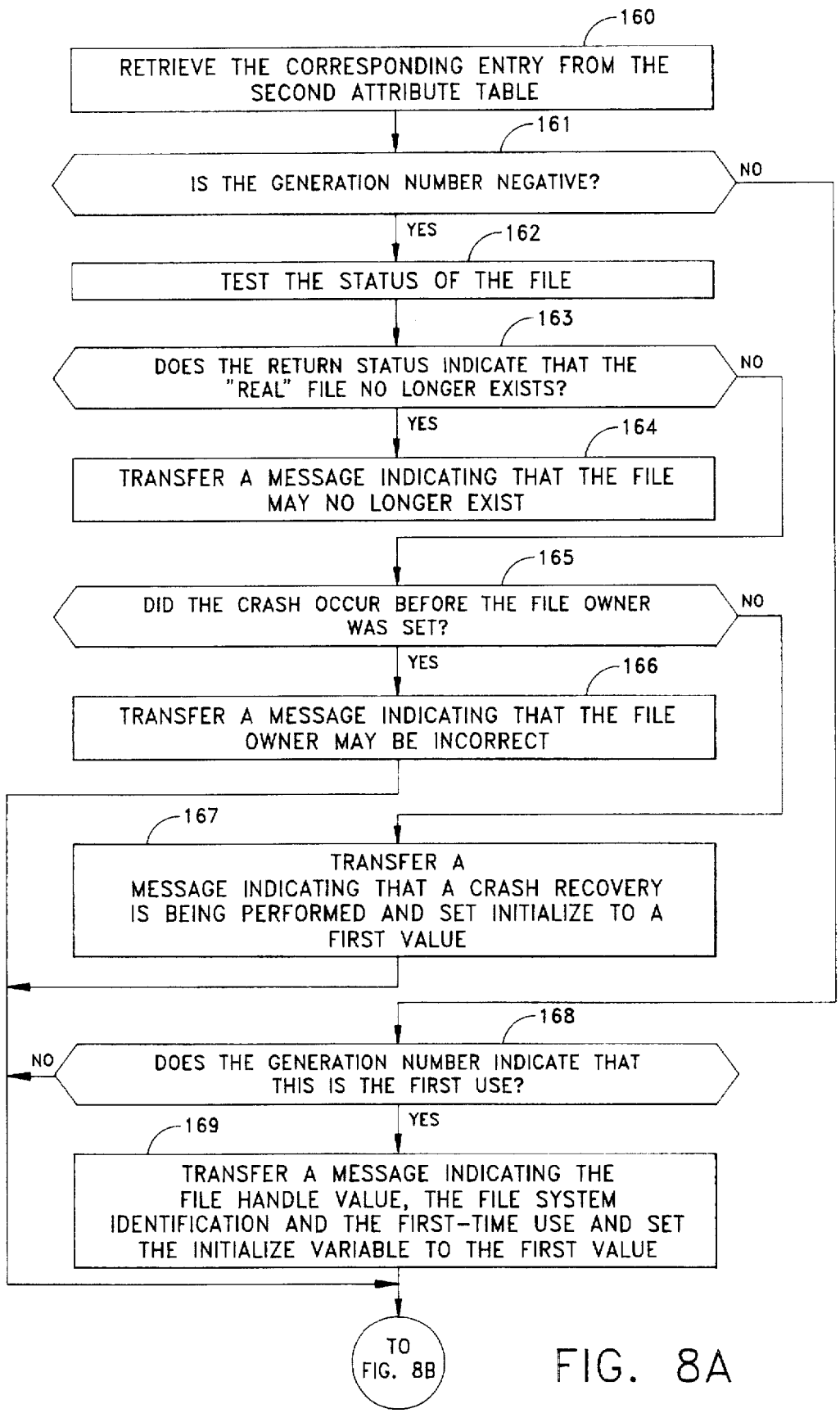
FIGS. 8A and 8B depict a process for crash recovery in accordance with this invention.
Figure 8B:
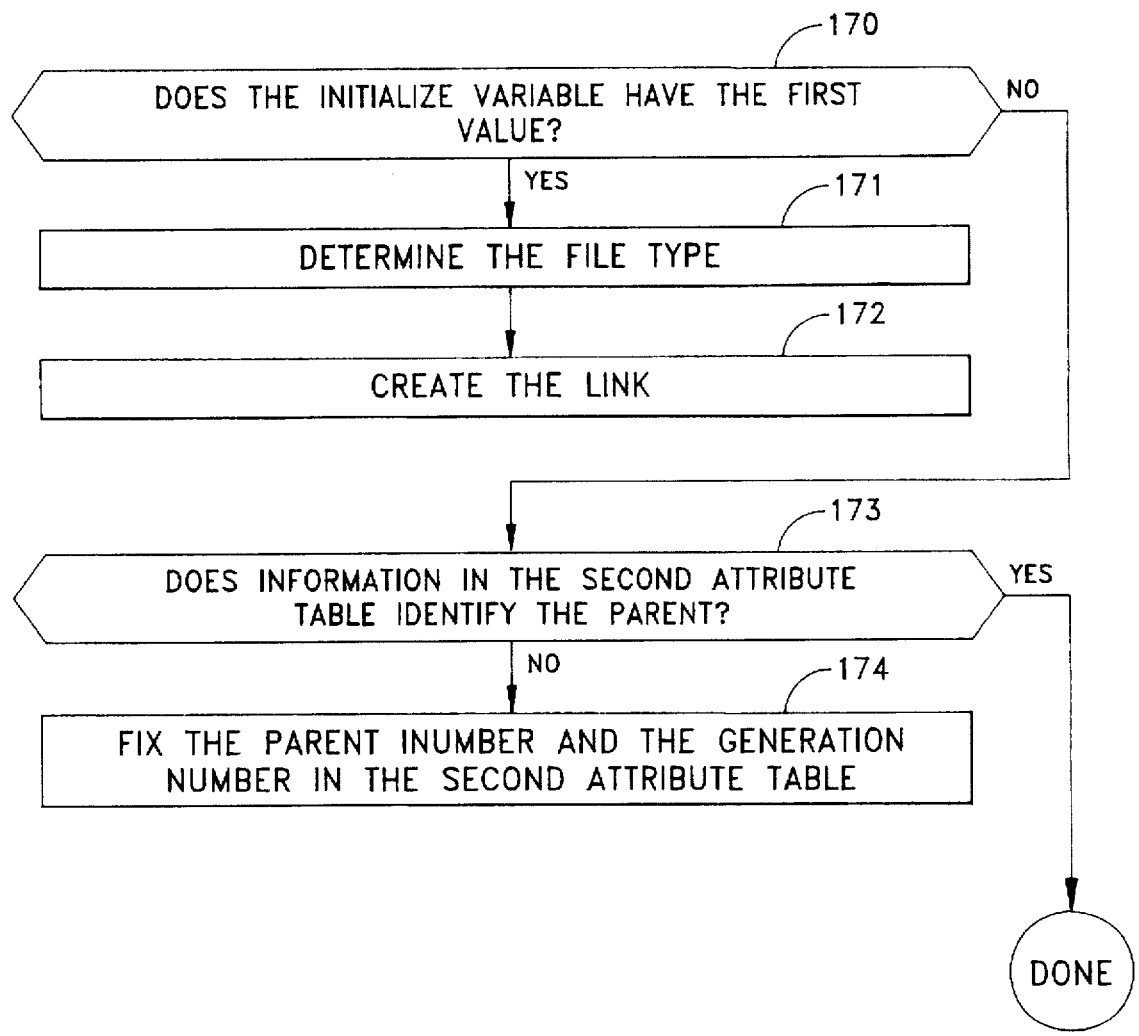

FIGS. 5, 8A and 8B, taken together, disclose a procedure by which a system constructed in accordance with this invention attempts to recover from a server crash. This process begins in step 160 when the system uses the FILESYS_ID variable 60 and a generation number, stored as an IGEN variable 76, from the second attribute table (i.e., the EXPATTR table 22 in FIG. 1) corresponding to the file handle. In step 161 the system determines whether the IGEN variable 76 has a negative value indicating that the crash may have occurred during the creation of a link. If a negative value exists, step 162 tests the status of the file. If the status indicates that there is no "real" file (i.e., there is a deleted file), step 163 diverts to step 164 whereupon the system prepares a message indicating that the file no longer exists and terminates further operations. If the return status does not indicate that a "real" file has been deleted, step 163 diverts to step 165 to determine whether the crash occurred during the creation sequence before a file owner was set. If it did, the system uses step 166 to generate and transfer a corresponding message; then control and transfers to FIG. 8B. Otherwise step 166 diverts to step.167 to generate a message indicating that a crash recovery is being performed and to set the INITIALIZE variable 77 to a first value (e.g., "TRUE") before transferring to FIG. 8B.

If the IGEN variable 76 is not negative, step 161 diverts to step 168 to determine whether the IGEN variable 76 is consistent with a first use of the file. If it is, in step 169 the system transfers a message indicating the first use and sets the INITIALIZED variable 77 to the first value.

Each of steps 166 through 169 transfers control to step 170 in FIG. 8B. If the INITIALIZE variable 77 has the first value (i.e., "TRUE") the system determines the file type in step 171 and creates a link in step 172 using the previously described steps of FIGS. 6A through 6C. If the system determines that the second attribute table identifies the parent, the crash recovery process is done. Otherwise step 173 branches to step 174 and the system fixes the parent inumber and the generation number in the second attribute table 22 in FIG. 1. This completes the crash recovery process.

There has thus been described, with reference to FIGS. 6A through 6E through 8B, three distinct procedures for a file server that utilizes an addressing scheme in accordance with this invention. As will be apparent, each of these operations is implemented utilizing only standard NFS calls to programs in kernel space. This enables the control programs to reside exclusively in user programming space. Consequently the system is readily transported from one file server to another. This specific implementation, with a limited number of directory tiers for obtaining the alternate pathname, such as the three tiers in the specific embodiment, greatly reduces the time required to identify the location of the file. Consequently this method and apparatus for file server addressing operates within the same time intervals as systems that incorporate and rely upon procedures that are within the kernel program space.

This invention has been disclosed in terms of certain embodiments. It will be apparent that many modifications can be made to the disclosed apparatus without departing from the invention. For example, this invention has been disclosed in terms of specific processes that can be implemented with C-based language. It will be apparent that other programming languages might also be used to implement this invention. Moreover, each of the processes includes specific checks and tests that could be altered to accommodate any particular application. Therefore, it is the intent of the appended claims to cover all such variations and modifications as come within the true spirit and scope of this invention.

What is claimed as new and desired to be secured by Letters Patent of the United States is:

1. In a file system in which a client pathname and a unique numerical value identify each file and in which certain operations return to the client a file handle including the unique numerical value and other operations transfer the file handle back to the file system and wherein the file system includes a first set of links for establishing correspondences between the client pathnames and unique numerical values, the improvement of alternate path addressing means for facilitating the location of a file in the file system in response to all other operations subsequent to the return of the file handle, said alternate path addressing means comprising:

(A) means for converting the unique numerical value in the returned file handle into an alternate pathname, (B) a second set of links for establishing correspondences between the alternate pathnames and the locations of files in the file system identified by each unique numerical value; and (C) means for obtaining the location of a file by selecting a corresponding link in said second set of links as determined by the alternate path name.

2. A file system as recited in claim 1 wherein the unique numerical value is a binary number and said converting means parses the unique numerical value into a plurality of hexadecimal values that collectively become the alternate pathname to an entry in said second set of links.

3. A file system as recited in claim 2 including a first attribute table and the file handle includes a second file identifier and wherein the improvement additionally comprises a second attribute table indexed from the unique numerical value, each entry in said second attribute table comprising a second file identifier for the corresponding file.

4. A file system as recited in claim 1 wherein the file handle includes a twenty-four binary bit unique numerical value and said converting means decomposes the unique numerical value into three-sections, each section including a two-digit hexadecimal value and said three sections defining the alternate pathname to an entry in said second set of links.

5. In a network including a client and a server interconnected by a communication link wherein the server comprises at least one file system in which individual files are organized in at least one directory for identification by client pathnames, wherein the server includes control programs located in user space and kernel space, wherein certain requests for file system operations sent from the client to the server contain client pathnames and produce file handles including a portion for specifying the server, an inode number specifying a file in the server and a file generation number, and wherein each file system includes a first set of links for establishing correspondences between client pathnames and inode numbers and an attribute table for storing certain characteristics of each file including the file generation number, the improvement of alternate path addressing means for allowing access from user space to an identified file by decoding file handles sent by all other commands subsequent to the return of the file handle, said alternate path addressing means comprising:

(A) means for receiving the returned file handle, (B) means in the user space for converting the inode number in a received file handle into an alternate pathname, (C) a second set of links in the file system establishing correspondences between the alternate pathname and an index node value, and (D) a second attribute table in user space indexed from the inode number, each entry in said second attribute table comprising a file generation number for the corresponding file.

6. A network as recited in claim 5 wherein the inode number is a binary number and said converting means parses the inode number into a plurality of hexadecimal values that define the alternate pathname through said second set of links.

7. A network as recited in claim 5 wherein the inode number is constituted by a twenty-four binary bit number and said converting means decomposes the inode number into three-sections, each section including a two-digit hexadecimal value and said three sections defining the alternate pathname to an entry in said second set of links.

8. A network as recited in claim 5 wherein said improvement additionally comprises means for comparing the file generation numbers in the file handle and said second attribute table.

9. A method for addressing one of a plurality of files in a file system at a server wherein each of the files is identified by an unique numerical value and by a client pathname, wherein the file system includes a first set of links for establishing correspondences between client pathnames and the unique numerical values and wherein certain client initiated operations convert a client pathname to a file handle with the corresponding unique numerical value that is returned to the client, all subsequent client initiated operations identifying a file with the returned file handle, the method comprising the steps of:

(A) responding to the subsequent client initiated operation by converting the unique numerical value in the file handle into an alternate pathname, and (B) retrieving the location of the file from a second set of links in response to the alternate pathname, said second set of links establishing correspondences between the alternate pathnames and the location of files in the file system.

10. A method as recited in claim 9 wherein the unique numerical value is a binary number, said conversion including parsing the unique numerical value into a plurality of hexadecimal values that form the alternate pathname to an entry in the second set of links.

11. A method as recited in claim 10 wherein each unique numerical value includes other information about each file, said method including forming for each file an entry in a second attribute table indexed from the unique numerical number, each entry in said second attribute table comprising information about the corresponding file in the file system, and validating the presented file handle by comparing the information retrieved with the unique numerical identifier and the second attribute table.

12. A method as recited in claim 9 wherein the other client operations identify a particular file with a file handle including a twenty-four binary bit unique numerical value and said conversion includes the steps of decomposing the unique numerical value into three-sections, each section including a two-digit hexadecimal value and combining the three sections into the alternate pathname to an entry in the second set of links.

13. A method for addressing a file in a server in a network including a client station interconnected to the server by a communication link wherein the server comprises at least one file system in which individual files are organized in at least one directory for identification by client pathnames and includes control programs located in user space and kernel space, wherein certain user requests for file system operations sent from the client to the server contain user pathnames and produce file handles returned to the client state for use by subsequent commands including a portion for specifying the server, an inode number specifying a file in the server and a file generation number, and wherein each file system includes a first set of links for establishing correspondences between each client pathname and inode number and an attribute table for storing certain characteristics of each file including the generation number, a method for allowing access from user space to an identified file by decoding in user space the server file handles sent by the subsequent commands comprising the steps of:

(A) receiving the file handle, (B) converting the received file handle into an alternate pathname based upon the inode number, (C) retrieving from a second set of links the contents of a storage location identified by the alternate pathname containing information about the inode number, (D) retrieving from an entry in a second attribute table indexed from the inode number, each entry in the second attribute table including the file generation number for the corresponding file, and (E) validating in user space the received file handle by comparing the file generation number in the file handle with the file generation number from the entry in the second attribute table.

14. A method as recited in claim 13 wherein the inode number is a binary number, said conversion parsing the inode number into a plurality of hexadecimal values that become the alternate pathname to a location in the second set of links.

15. A method as recited in claim 13 wherein the inode number is constituted by a twenty-four binary bit number and said conversion decomposes the inode number into three sections, each section including a two-digit hexadecimal value and defines the alternate pathname to the entry in the second set of links using the three sections.

* * * * *